United States Patent [19]

Skibinski

[11] Patent Number: 4,872,523

[45] Date of Patent: Oct. 10, 1989

[54] TORQUE SUSPENSION WEIGHING SCALE

[75] Inventor: Robert E. Skibinski, Tompkinsville, Ky.

[73] Assignee: Mid-America Scale, Inc., Tompkinsville, Ky.

[21] Appl. No.: 298,915

[22] Filed: Jan. 19, 1989

Related U.S. Application Data

[63] Continuation of Ser. No. 200,523, May 23, 1988.

[51] Int. Cl.⁴ .......................................... G01G 21/24
[52] U.S. Cl. ............................... 177/255; 177/DIG. 9
[58] Field of Search .......... 177/187, 255, 256, DIG. 9

[56] References Cited

U.S. PATENT DOCUMENTS

| | | | |
|---|---|---|---|
| 2,736,549 | 2/1956 | Paul | 177/DIG. 9 |
| 3,512,595 | 5/1970 | Laimins | 177/DIG. 9 |
| 3,894,595 | 7/1975 | Czyryk | 177/DIG. 9 |
| 4,023,634 | 5/1977 | Provi et al. | 177/DIG. 9 |
| 4,050,532 | 9/1977 | Provi et al. | 177/256 X |
| 4,241,801 | 12/1980 | Kushmuk | 177/DIG. 9 |

*Primary Examiner*—George H. Miller, Jr.
*Attorney, Agent, or Firm*—Birch, Stewart, Kolasch & Birch

[57] ABSTRACT

A torque suspension weighing scale includes a subframe, a weighing platform, a torque suspension members all integrally combined by unique ball and seat retention assemblies fitted within keyhole formations formed in each of the subframe and weighing platform.

4 Claims, 4 Drawing Sheets

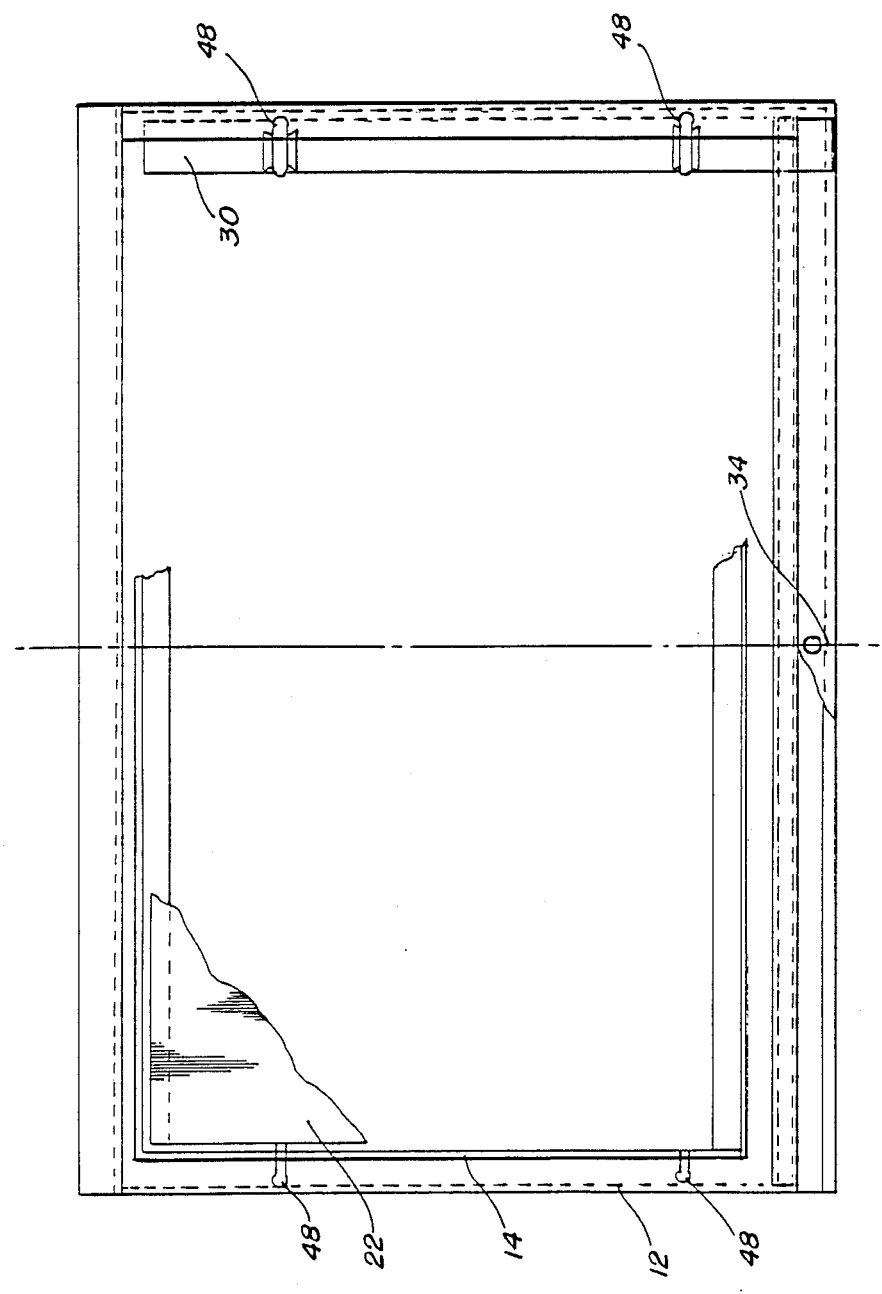

TORQUE SUSPENSION WEIGHING SCALE

This application is a continuation of copending application Ser. No. 200,523, filed on May 23, 1988.

BACKGROUND OF THE INVENTION

1. Field of the Invention

The present invention relates to a torque suspension weighing scale, including a subframe, torque tubes, and a weigh bridge. More specifically, the present invention relates to a torque suspension weighing scale having an improved arrangement for securing suspended torque tubes to both the subframe and platform which imparts greater sensitivity to the scale by preventing lateral displacement of a ball and seat retention assembly with respect to the subframe and platform when force is applied to the platform for weighing purposes.

2. Description of Related Art

Heretofore, torque suspension weighing scales have typically be found in livestock scale applications. These scales primarily utilized cable assemblies which are less flexible than is desirable to provide good self alignment between a subframe and weighing platform. In addition, the method of retaining the ends of the cable was to drill a hole in a mating steel structure, hook the end of the cable through the hole, and stake on a retaining collar, which induces further misalignment into the non-flexible cable, thereby resulting in a scale with very little sensitivity. Other manufacturers have previously used commonly accepted pivot and bearing methods which usually work well but are costly to produce.

Accordingly, a need in the art exist for a torque suspension weighing scale which has tolerance and sensitivity requirements conforming to those set forth by the National Bureau of Standards for a "legal-for-trade" scale. Additionally, it has become necessary in the art to develop a scale which is accurate and stable over a wide variety of uses or particular animal sizes if used as a livestock weighing scale and which imparts greater sensitivity to the scale. It is necessary to prevent lateral displacement of the anchoring device for the weigh cables with respect to the subframe and the platform when force is applied to the platform in a weighing operation.

SUMMARY OF THE INVENTION

Accordingly, it is a primary object of the present invention to provide a torque suspension weighing scale having a subframe, weighing platform, and torque tubes which provides greater sensitivity for weighing purposes.

The object of the present invention is fulfilled by providing a torque suspension weighing scale comprising: a subframe; inverted L shaped uprights position on the subframe; a weighing platform; L shaped legs depending from the platform; torque suspension members supporting the weighing platform in a spaced apart relation from the subframe; means for connecting the torque suspension members to both the subframe and the weighing platform; a positive displacement scale; means for connecting the torque suspension members to both the subframe and the weighing platform; means for connecting the torque suspension members to the positive displacement scale, the means for connecting including lever arms fixed to first opposing ends of parallel torque suspension members, a keyhole slot formed in the free ends of adjacent lever arms, a cable aligning the lever arms in an upper and lower relationship, and a ball an seat retention assembly surrounding the cable at a lower side of each of the upper and lower lever arms, the ball and seat retention assembly being fitted into respective ones of the keyhole slots to provide positive lateral positioning of the retention assemblies with respect to the lever arms; and means for transmitting torque applied to the torque suspension members to the positive displacement scale.

The torque suspension members are connected to both the subframe and the weighing scale with a weigh cable threaded through convolutions in the outer surface of the torque suspension member. A ball is fixed to the exposed ends of the weigh cable, a seat retention system is slidable along the axial surface of each end of the weigh cable, a keyhole slot is formed in a short end of each of the inverted L shaped uprights and L shaped legs depending from the platform, wherein weight applied to the platform will force the depending legs downward causing the balls to fit securely within the seat retention system inserted into the keyhole slots.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention, and wherein.

The illustration depicts use of an electronic digital weight indicator, which is used in conjuction with an electronic load cell. However, a mechanical weigh beam, with either a hydraulic indicator or electronic indicator with a pressure transducer could also be used with this scale configuration.

Figure 2:
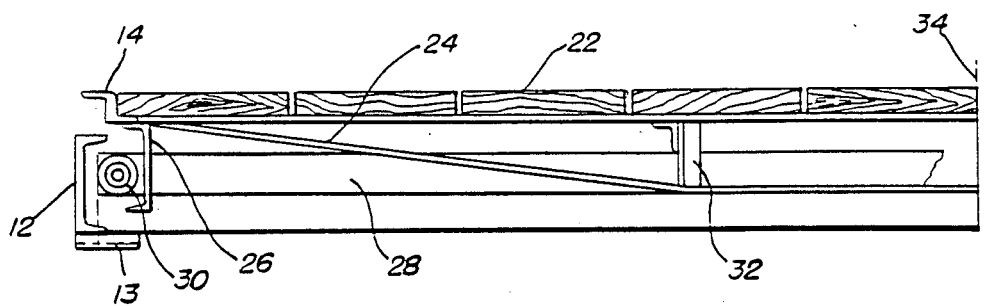
Figure 3:
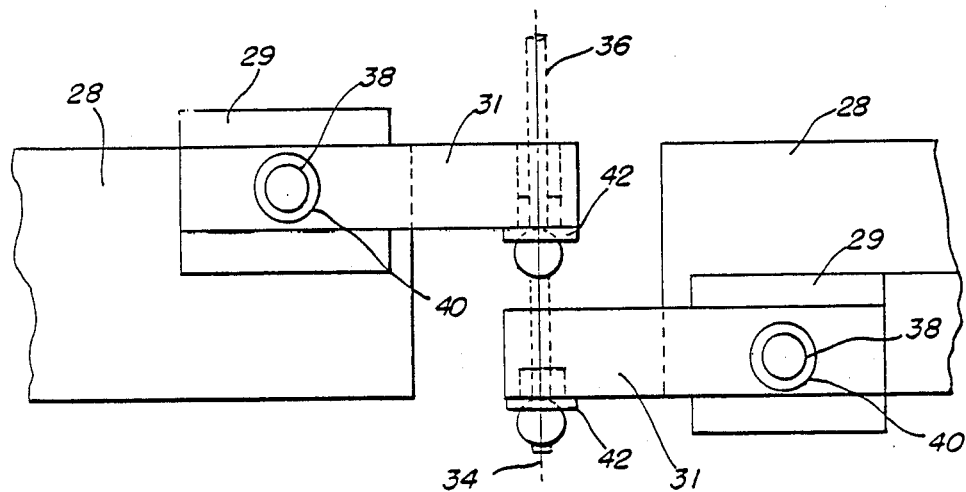
Figure 4:
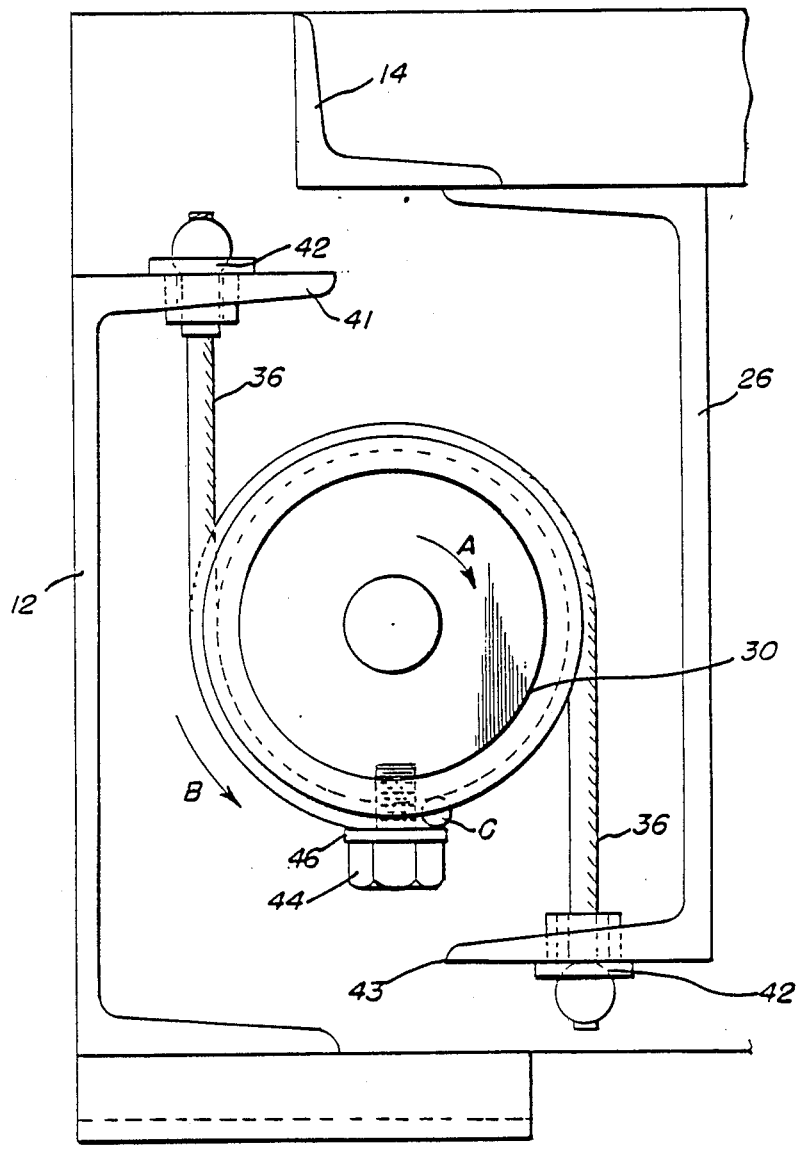
Figure 5:
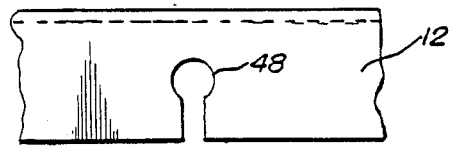
Figure 6:
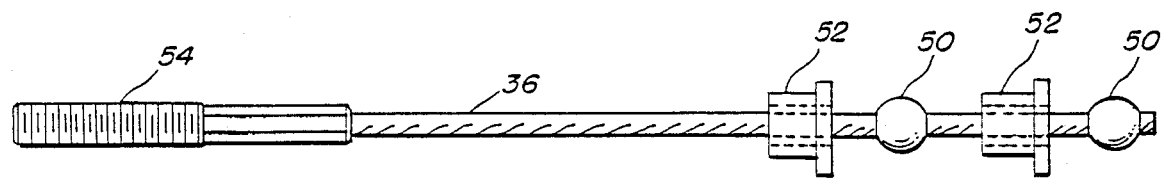
Figure 7:
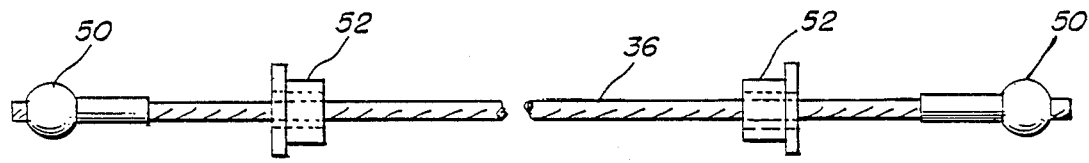
Figure 8:
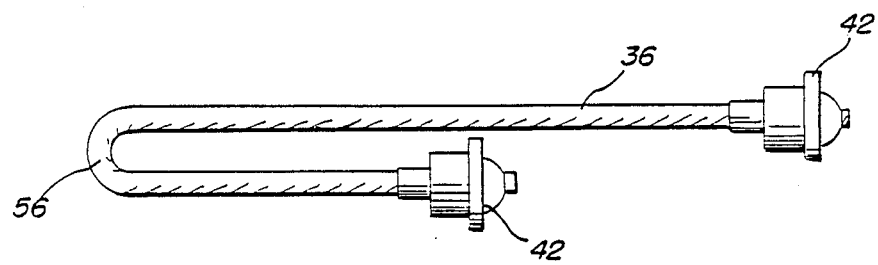

FIG. 2 is a cross sectional view of one half of the weighing scale of the present invention including the platform and subframe;

FIG. 3 is a cross sectional view taken at the center line of FIG. 2 showing the connection of lever arms to a secondary retention assembly of the present invention;

FIG. 4 is a cross sectional view of a primary retention assembly for connecting the subframe to the platform in the present invention;

FIG. 5 is a top partial view of a keyhole slot formed within an L-shaped extension member of each of the subframe and platform;

FIG. 6 is a cross sectional view of ball and seat fittings for the secondary weigh cable as used in FIG. 3;

FIG. 7 is a cross sectional view of ball and seat fittings for the primary weigh cable as used in FIG. 4;

FIG. 8 is a cross sectional view of ball and seat fittings in an assembled position; and FIG. 9 is a top plan, partially cut away view of the weighing scale platform superimposed upon the subframe and showing keyhole locations for use in the torque suspension weighing scale of the present invention.

DETAILED DESCRIPTION OF PREFERRED EMBODIMENTS

Figure 1:
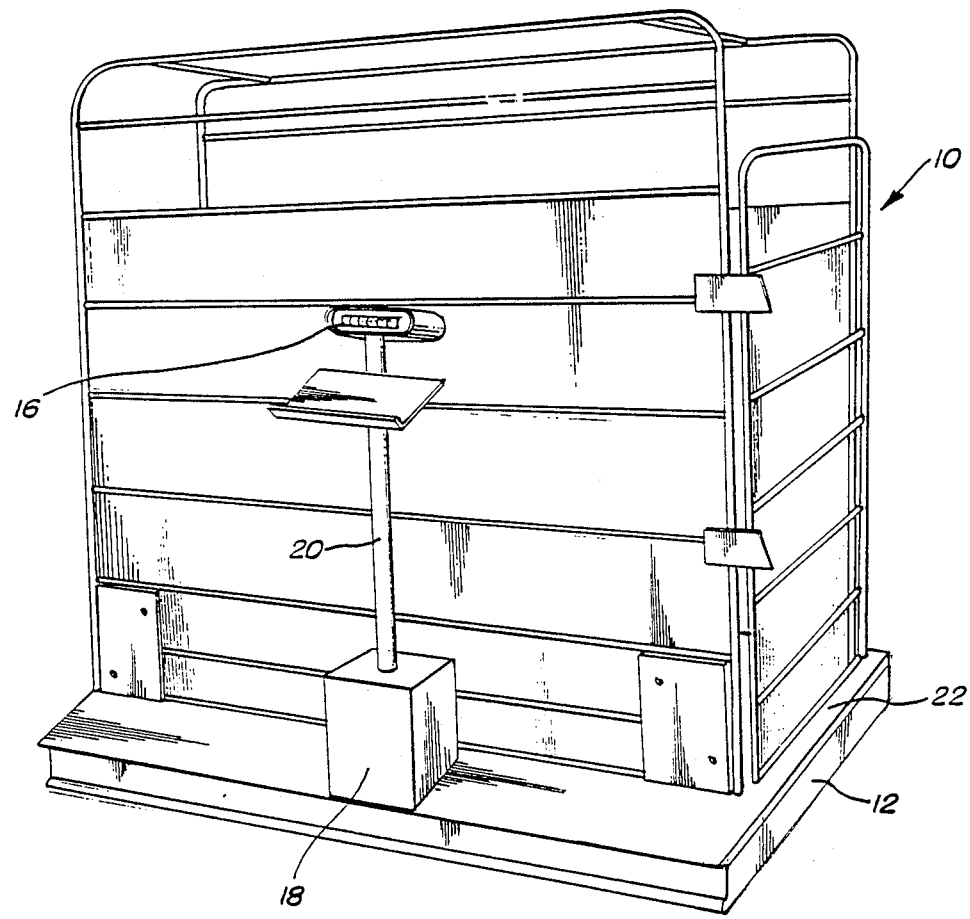
FIG. 1 is a perspective view of a torque suspension weighing scale as employed in a livestock type scale.

Referring to FIG. 1, there is generally shown a livestock scale 10 of a four sided construction having a subframe 12, a platform 22 supported on the weigh bridge 14 (see FIG. 2), a weigh indicator 16, and an electronic load cell housed within enclosure 18 which transfers force induced into the load cell into an electric signal used by indicator 16.

FIG. 2 is a cross sectional view showing one half of the torque suspension weighing scale, and includes the primary components of the subframe 12, weigh bridge 14, and torque tube 30. Supported on the weigh bridge 14 is a platform or deck 22 upon which an animal or item to be weighed will be placed. A structural support bar 24 is also provided to be connected to the base of the weigh bridge 14. A depending bridge riser 26 of an inverted C shape is attached to each end of the weigh bridge 14 on the under side thereof. This depending bridge riser extends along the entire under side width of the weigh bridge at opposing ends thereof. As previously indicated a subframe 12 is provided on a base 13, and is also of an elongated C-shape, the subframe being positioned in an opposing relationship to the bridge riser 26. Positioned between the subframe 12 and bridge riser 26 is a torque tube 30. Connection of the torque tube 30 to each of the subframe 12 and platform 14 will be described in connection with FIG. 4. Attached to torque tube 30 is a lever arm 28 extending perpendicular to the torque tube. It should be noted that FIG. 2 only represents one half of the length of the torque suspension scale, such that a similar lever arm 28 extends from an opposing torque tube at the opposite end of the scale. The two lever arms 28 meet at center line 34 and are joined as shown in FIG. 3. An additional intermediate weigh bridge support 32 is provided to add structural stability to the weigh bridge and platform.

FIG. 3 shows the secondary retention assembly having adjoining lever arms 28, blocks 29 attached to an upper portion of one lever arm and a lower portion of the opposing lever arm, and adjustable nose irons 31 attached to arms 28 and overlapping at center line 34. The adjustable nose irons are fixed to the lever arms 28 by means of a bolt. A ball and seat retention assembly 42 is provided to be positioned on the under side of both nose irons 31, their manner of connection to be described in FIGS. 6-8. A weigh cable 36 extends from the lowest ball and seat retention member 42 along th center line 34 up to the load cell which is electrically connected to the weight indicator shown in FIG. 1. The cable 36 used as the weigh cable of the present invention is made of a $7 \times 19$ stainless steel strand core cable, which is strong yet flexible enough for good self alignment. The cable utilized in the present device enhances scale sensitivity, while being at the same time an economical choice. The load applied to the platform 14 translates to a reduction of 20.47 times the amount applied to the scale. For instance, if a three thousand pound animal were applied to the scale, the reduction factor of 20.47 would result in only 146.5 pounds being applied to the nose irons 31 at the center line 34 for indication on the weigh indicator 16.

FIG. 4 shows the primary retention assembly with the connection between the weigh bridge or platform 14 and the subframe 12 via the torque tube 30. In particular, the ball and seat retention assembly 42 is supported at the upper extension 41 and lower extension 43 by means of a keyhole slot 48 (shown in FIG. 5). The cylindrical torque member 30 is of a specific diameter on the order of two inches or a schedule 80 pipe 38 and $\frac{5}{8}$ inches long to work in combination with the weigh cable 36 to more accurately measure weight. Convolutions are provided in the exterior surface of the torque member 30 to secure the weigh cable 36 and prevent slippage during a weighing operation and also to provide dimensional accuracy of plus or minus one one thousandth of an inch ($\pm 0.001''$) in the diameter of the torque tubes which would be impossible if the tubes were not convoluted. Cable 36 depends from the upper extension member 41 to circumscribe the torque tube 30 for one quarter revolution and is wrapped around the shank of bolt 44 toward the observer at location C to be reverse wrapped around the torque tube in the direction A and depend down toward lower extension 43 and fitted into another ball and seat retention assembly 42 formed in bridge riser 26. When force is applied to the platform or weigh bridge 14, the torque tube 30 is rotated in the direction indicated by arrow A, thereby stressing the cable around the torque tube, the force applied to the torque tube being translated through lever arms 24 as previously indicated to the center line of the platform to be weighed at a load cell 18 shown in FIG. 1. Due to the ball and seat retention assembly 42 provided in each of the subframe 12 and bridge riser 26 of the weigh bridge 14, the cable 36 precisely aligns itself without producing any external side forces, thereby providing accurate sensitive measurements.

As previously indicated, the ball and seat retention assembly 42 is inserted within keyhole 48 of the upper extension arm 41 of the subframe 12 and the lower extension arm 43 of bridge riser 26.

FIG. 6 is a more detailed view of the ball and seat retention assembly 42 described in connection with the present invention and as utilized at the center line of the load cell 18 shown in FIG. 1 and FIG. 3. In particular, there is shown a ball seat 52, and ball members 50 which are swedged onto the strand core cable 36 as shown. A threaded plug 54 is utilized as the base portion which is extended in FIG. 3 up to the load cell 18 as shown in FIG. 1.

FIG. 7 shows a similar arrangement including the ball seats 52 and swedged balls 50 in connection with the core strand cable 36, this arrangement having the ball member at each of end of the cable being utilized in connection with FIG. 4 wherein the cable 36 is wrapped around the cylindrical torque member 30. An additional silver soldered area may be applied to the bent portion of weigh cable 36 in order to retain the shape of the cable as it is wrapped around the cylindrical torque member 32 and shank of bolt 44 just above washer 46 (see FIG. 4).

With the ball and seat retention assembly 42 of the present invention in which a ball 50 and ball seat 52 combination is fitted into a separate flanged seat on each end of a weigh cable, greater stability and anchoring properties are provided. The ball seat 52, as previously indicated is mated with a corresponding key hole slot 48 along the periphery of a suspended weighing platform 14 as more clearly shown in FIG. 9. The other end of the cable 36, having a second ball and seat retention assembly is positioned in convolutions along the outer surface of the cylindrical torque member 30, and ultimately connected to the base or subframe 12 of the scale at the lower extension arm 43. Thus, the ball and seat retention assembly 42 produces a system which inserted into keyhole slots which allow the cables 36 to precisely align themselves without producing any external side forces due to the retention assembly. The keyhole slots provide positive lateral positioning of the ball and seat assembly, and eliminate any guessing as to the proper location of the cables and their retention assemblies in a weigh scale.

As more clearly shown in FIG. 9, the cylindrical torque member 30 is positioned along the width of each end of the livestock scale, and requires two cable and seat retention assembly devices fitted within corresponding keyhole slots 48 for each torque tube 30. Element 34 shows the location of the center vertical secondary retention assembly described in connection with FIG. 3.

It should be understood that the torque suspension weighing scale of the present invention provides unique retention assemblies which substantially increase the sensitivity and practicality of livestock weighing scales or other heavy duty scales requiring a high amount of precision in their measurements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for securely fastening a torque suspension member to a subframe and a weighing platform in a torque suspension weighing scale comprising:

weigh cable means separately surrounding said torque suspension member at a predetermined location thereof, said weigh cable means including;

a ball member fixed to each exposed end of said weigh cable means;

a plurality of seat retention members axially movable along said weigh cable means and corresponding to each said ball member; and means for supporting said ball and seat members in said predetermined locations of said weigh cable means;

wherein said ball member fits within said seat retention member with respect to each said subframe and weighing platform on said means for supporting when torque is applied to said torque suspension member in response to force applied to said weighing platform.

2. An apparatus according to claim 1, further including means for transferring torque applied to said torque suspension member to a positive displacement scale.

3. An apparatus according to claim 1, wherein at least two torque suspension members may be provided for a single torque suspension weighing scale.

4. An apparatus according to claim 1, wherein said means for supporting includes a keyhole member formed therein, and wherein each ball member fits within a corresponding seat retention member positioned in a respective keyhole member to provide positive lateral positioning of a combined ball and seat retention assembly, whereby the torque suspension weighing scale has increased sensitivity without slippage at said means for supporting.

* * * * *